April 7, 1964   J. C. NIRSCHL   3,128,380
GAMMA RADIATION SCANNER AND AN AERIAL SURVEYING AND
RECORDING SYSTEM UTILIZING THE SAME
Filed Oct. 30, 1961   2 Sheets-Sheet 1

INVENTOR,
JOSEPH C. NIRSCHL
BY
*Jack H. Linscott*
ATTORNEY.

INVENTOR,
JOSEPH C. NIRSCHL
BY
ATTORNEY.

United States Patent Office 3,128,380
Patented Apr. 7, 1964

3,128,380
GAMMA RADIATION SCANNER AND AN AERIAL SURVEYING AND RECORDING SYSTEM UTILIZING THE SAME
Joseph C. Nirschl, Elberon, N.J., assignor to the United States of America as represented by the Secretary of the Army
Filed Oct. 30, 1961, Ser. No. 148,780
4 Claims. (Cl. 250—83.3)
(Granted under Title 35, U.S. Code (1952), sec. 266)

The invention described herein may be manufactured and used by or for the Government for governmental purposes without the payment of any royalty thereon.

The present invention relates to an aerial scanner and recorder for surveying the gamma-ray contamination of the ground beneath a moving aircraft. More particularly, the invention provides a radiation detection system capable of surveying and recording the contamination of large areas quickly and accurately.

Briefly stated, the scanner comprises a central radiation detector surrounded by a stationary radiation shield with an angular cutaway section, the stationary shield in turn being inclosed by a rotating shield which includes a plurality of radial radiation-admitting and collimating bores. As the outer shield is rotated, the radiation detector scans a strip of ground generally transverse to the aircraft's flight path. The radiation detector output is fed to a recording system which produces a continuous photographic map of the gamma-ray activity of the surveyed area.

It is therefore an object of this invention to provide a novel and useful aerial scanner and recorder.

Other objects and advantages as well as the operation and structure of this invention will be better understood with reference to the following detailed description and the drawings, in which.

Figure 1:
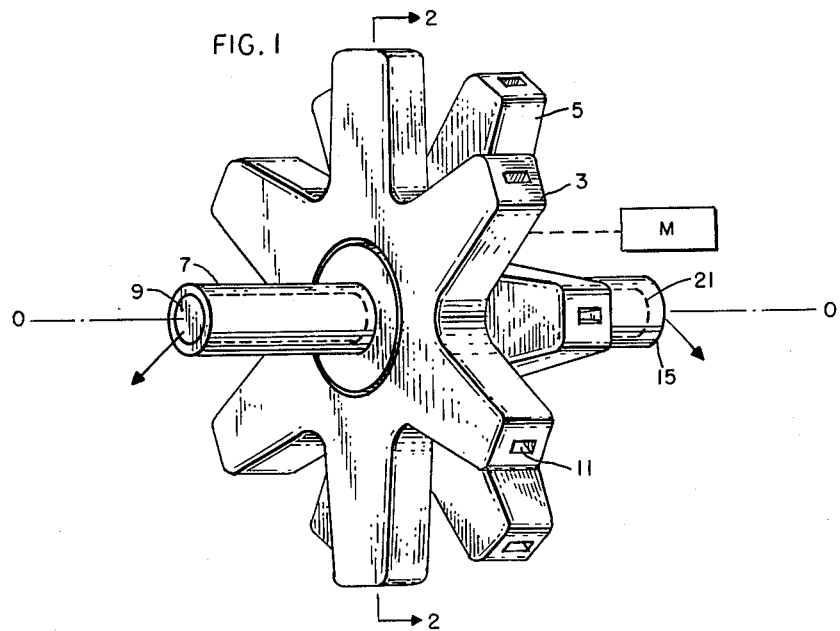
FIG. 1 is an isometric view of a pair of scanners constructed according to the invention and arranged for rotation about the same axis.
Figure 2:
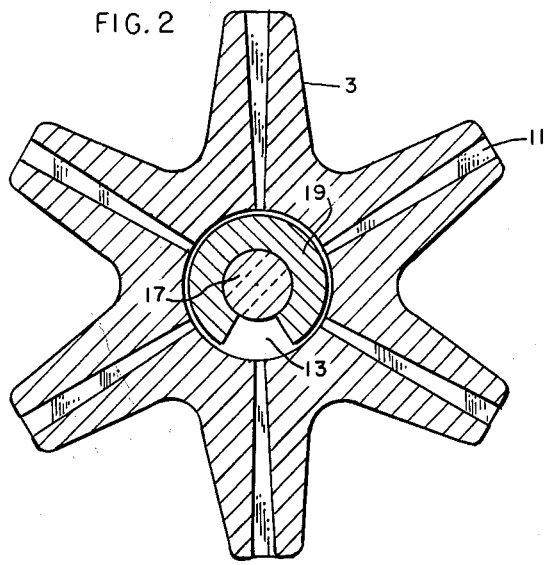
FIG. 2 is a sectional view of FIG. 1 taken along the line 2—2 and showing the interior construction of each of the scanners of FIG. 1.

Referring first to FIGS. 1 and 2, 3 and 5 are the rotating shields of a pair of scanners mounted adjacent each other and rotating about a common axis O—O. Each of the rotating shields comprises a gear-like arrangement of six teeth, each tooth having a radiation-admitting and collimating bore 11, of rectangular cross-section. The bore cross-section flares out in a linear manner toward the periphery in order to provide an aperture of increased area, thereby permitting the observation of a larger area of the ground. The rotating shields rotate around hollow shafts 7 and 15. Both rotating shields are driven together by variable speed motor M. The teeth of shield 5 are positioned midway between those of shield 3, for reasons which will become apparent. Positioned within each rotating shield is a generally cylindrical stationary shield 19, with a circular central bore which contains radiation detector 17 and an angular, downward directed cutaway section 13. Both the rotating and stationary shields are made of radiation absorbing material, such as lead. Cutaway section 13 is 60° wide and therefore corresponds to the angular spacing between adjacent bores in the rotating shield. Radiation detector 17 may be a crystal of a type which scintillates when gamma radiation falls on it and therefore converts the gamma-rays into corresponding pulses of light. Mounted within the hollow shafts 7 and 15 and adjacent the radiation detectors are two photoelectric devices 9 and 21, which convert the light output of the radiation detectors to electrical impulses. Devices 9 and 21 may be photo-multiplier tubes, for example, and are connected to the recording circuit of FIG. 3.

In operation, the dual scanner of FIG. 1 is arranged with its axis of rotation O—O parallel to the fore and aft axis of the aircraft and cutaway section 13 is directed downward. In this position it will scan the earth in the manner shown in FIG. 4, in which the position of the aircraft at successive points of time are represented by 1-4 and 5, 6, 7 represent successive adjacent scanned strips. The area axb represents the elementary viewing area which is determined by the dimensions of the rectangular bores and the height of the aircraft. As a bore of the first scanner enters the cutaway section of the stationary shield, its detector will be observing the left side of scanning strip 5 and the aircraft is at position 1. When the aircraft reaches position 2, the first scanner is observing the area of strip 5 directly below the aircraft, and, due to the out-of-phase relationship between the two scanners, the second scanner will be starting to scan strip 6. When the aircraft reaches position 3, the first scanner is completing the observation of strip 5 and the second scanner is halfway through the scanning of strip 6. At this point the next adjacent bore of the first scanner enters the cutaway area and the scanning of strip 7 begins. Thus the scanners scan alternate, inter-leaved strips. It can be seen from FIG. 4 that the rotational speed of the scanners must be correlated with the ground speed of the aircraft in order that there be no overlapping or gaps between adjacent scanned strips. It can be seen that the aircraft speed should be such that the scanner rotates 30° while the aircraft travels across the width of one scanning strip. The rotational speed of the scanners is controlled by motor M in FIG. 1, which may be tied in with the aircraft's speed measuring equipment to automatically adjust the scanner speed to the proper value. It can also be seen that the use of two out-of-phase scanners permits the scanning rate to be cut in half compared to that which would be necessary if only a single scanner were used.

Figure 3:
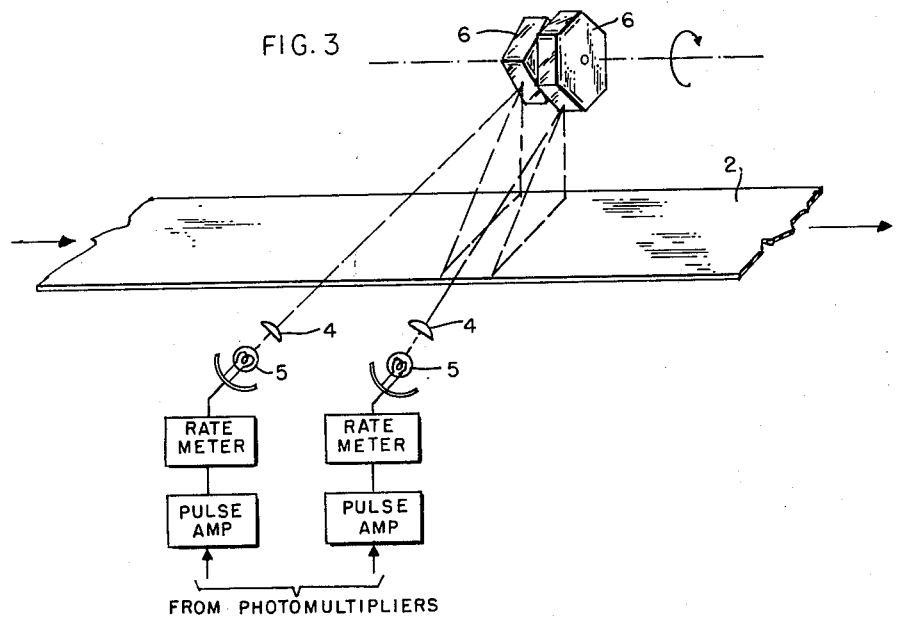
FIG. 3 is a schematic diagram of the radiation recording or mapping equipment which is connected to the output of the scanners of FIG. 1.

FIG. 3 shows a schematic of the recording device which is connected to the scanners of FIG. 1 to produce a permanent photographic record of the survey. The equipment of FIG. 3 provides separate channels for each of the photo-multiplier outputs of FIG. 1. Each of the photo-multiplier outputs is first passed through a pulse amplifier then to a counting rate meter. The output of the rate meter is a signal which varies in amplitude according to the frequency of the pulses from the radiation detector. The output of the rate meters are applied to lamps 5, which may be of a gaseous type in order to follow the rapid variations in the output of the rate meters. The outputs of the lamps 5, are focused, by means of lens 4, onto a pair of rotating mirrors 6, which direct the light across a moving strip of film, 2. The mirrors are arranged to rotate together but out-of-phase in order that the scanning action of the mirrors wil be analogous to that of the scanners of FIG. 1. The mirrors are synchronized with the scanners of FIG. 1 and may be driven by the same motor. In addition, the speed of the film 2 is correlated with the aircraft's speed. Thus the film 2 provides a permanent record of the gamma-ray activity of the surveyed area.

Figure 4:
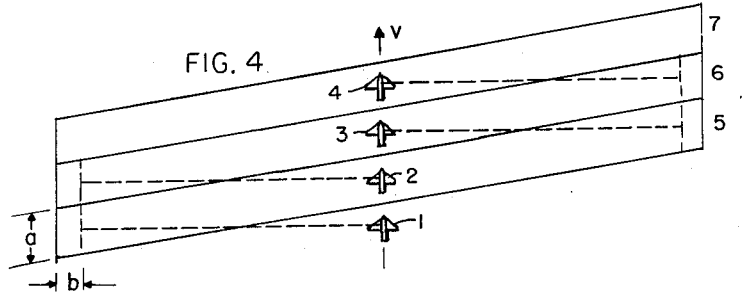
FIGS. 4 and 5 are plan views of an aircraft in the scanning process and illustrating several successive scans.
Figure 5:
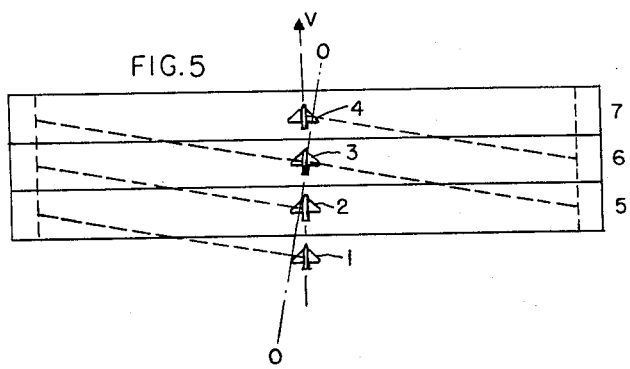

In FIG. 4 it can be seen that the scanning strips are not exactly transverse to the aircraft's flight path, due to the fact that the craft moves a certain distance during each scan. The result is that the scanning lines on film 2 will be canted at an angle. This can be corrected by turning the axis O—O of the scanner so that it is slightly off the fore and aft axis of the aircraft but still in the horizontal plane. The scanner will then be "looking" forward during the first half of a scanning strip and backward during the second half. This is illustrated in FIG. 5, which shows the axis O—O of the scanner relative to the flight path of the aircraft, indicated by the vector V. If the axis of rotation of the mirrors 6 is then adjusted to match that of the scanners, the scanning lines on the film can be made perpendicular to the long dimension thereof.

While a specific embodiment of this invention has been illustrated, modifications thereof will suggest themselves to those skilled in this art. For example, while a dual scanner has been illustrated in FIG. 1, it is obvious that a single scanner can also be used, but will require a higher scanning rate. Also, more than two scanners may be used simultaneously to further lower the scanning rate. Further, the number of bores in the rotating shield need not be six, however, the width of the angular cutout in the stationary shield should be made equal to the angular spacing between adjacent bores. The gear-like shape of the rotating shield is not essential to the practice of the invention, other shapes are possible, for example, this element may take the shape of a drum or cylinder, however the shape illustrated has been found to provide maximum collimation with minimum weight. Accordingly, the invention should be limited only by the scope of the appended claims.

What is claimed is:

1. A radiation scanner comprising, a radiation detector positioned within a generally cylindrical stationary radiation shield, said stationary shield having an angular cutaway section, a rotating radiation shield surrounding said stationary shield, said rotating shield being in the shape of a gear with radial radiation-admitting and collimating bores in each of the teeth of said gear, the angular spacing between adjacent bores being the same as the angular extent of said cutaway section.

2. The structure of claim 1, in which said bores are of rectangular cross-section which flares out in a linear manner toward the periphery thereof.

3. A radiation scanner comprising, a central radiation detector surrounded by a generally cylindrical stationary shield, said stationary shield having an angular cutaway section, a rotating shield mounted concentrically with said stationary shield, said rotating shield including a plurality of radial radiation-admitting and collimating bores, the angular spacing between adjacent bores being the same as the angular extent of said cutaway section, said rotating shield being in the shape of a gear having six teeth, each tooth containing one of said bores.

4. A radiation surveying and recording system comprising; a pair of radiation scanners mounted adjacent each other on the same axis of rotation, each scanner comprising; a central radiation detector surrounded by a generally cylindrical stationary shield, said stationary shield having a downwardly directed angular cutaway section, a rotating shield mounted concentrically with said stationary shield, said rotating shield having a plurality of radial radiation admitting and collimating bores, the angular spacing between adjacent bores being the same as the angular extent of said cutaway section, both of said scanners being rotated together by a common driving means, the bores of one scanner being midway between those of the other scanner, each of said scanners being adapted to scan alternate, inter-leaved strips of ground beneath an aircraft, means to convert the outputs of said radiation detectors into light beams, means for focusing said light beams onto a pair of rotating mirrors driven synchronously with said scanners and being adapted to direct said light beams across a strip of moving film, thereby producing a radiation map of the surveyed area.

References Cited in the file of this patent

UNITED STATES PATENTS

| | | |
|---|---|---|
| 1,747,791 | Peterson | Feb. 18, 1930 |
| 2,680,201 | Scherbatskoy | June 1, 1954 |
| 2,764,755 | Aiken et al. | Sept. 25, 1956 |
| 2,769,918 | Tittle | Nov. 6, 1956 |
| 2,950,393 | Southward | Aug. 23, 1960 |
| 3,011,057 | Anger | Nov. 28, 1961 |
| 3,028,493 | Takahashi | Apr. 3, 1962 |